(12) United States Patent
Yamauchi

(10) Patent No.: US 9,134,192 B2
(45) Date of Patent: Sep. 15, 2015

(54) PRESSURE GAUGE

(75) Inventor: Takeshi Yamauchi, Tokyo (JP)

(73) Assignee: KOGNAEI CORPORATION, Tokyo (JP)

( * ) Notice: Subject to any disclaimer, the term of this patent is extended or adjusted under 35 U.S.C. 154(b) by 268 days.

(21) Appl. No.: 13/695,978

(22) PCT Filed: Jan. 25, 2011

(86) PCT No.: PCT/JP2011/051349
§ 371 (c)(1),
(2), (4) Date: Nov. 2, 2012

(87) PCT Pub. No.: WO2012/011291
PCT Pub. Date: Jan. 26, 2012

(65) Prior Publication Data
US 2013/0112003 A1    May 9, 2013

(30) Foreign Application Priority Data

Jul. 23, 2010  (JP) .................................. 2010-165872

(51) Int. Cl.
*G01D 13/22*    (2006.01)
*G01L 19/16*    (2006.01)
*G01L 7/04*    (2006.01)

(52) U.S. Cl.
CPC  *G01L 7/04* (2013.01); *G01D 13/22* (2013.01); *G01L 7/043* (2013.01); *G01L 19/16* (2013.01)

(58) Field of Classification Search
CPC .......... G01L 7/04; G01L 19/10; G01D 13/10; G01D 13/22; G12B 11/04

USPC ......... 116/291, 292, 295, 296, 302, 304, 305, 116/319, DIG. 3, 271; 73/866.3
See application file for complete search history.

(56) References Cited

U.S. PATENT DOCUMENTS

| 4,020,787 A | * | 5/1977 | Castro et al. .................. 116/300 |
| 4,773,270 A | * | 9/1988 | Ogasawara et al. ............. 73/732 |
| 2004/0020302 A1 | | 2/2004 | Okitsu |
| 2011/0290172 A1 | | 12/2011 | Yamauchi |

FOREIGN PATENT DOCUMENTS

| CN | 102308193 A | 1/2012 |
| EP | 2397831 A1 | 12/2011 |
| JP | S5151846 | 4/1976 |

(Continued)

OTHER PUBLICATIONS

English translation of JP 62-132440 U.*

(Continued)

*Primary Examiner* — Daniel S Larkin
*Assistant Examiner* — Irving A Campbell
(74) *Attorney, Agent, or Firm* — MKG LLC

(57) ABSTRACT

A pressure gauge has an indicator needle and a scale plate. A preset pressure indicating member extending along a pressure scale in a circular arc pattern is slidably attached to a front wall of a case, and provided with a first display section. An opaque shield portion provided with a second display section at one end thereof is provided to a transparent cover rotatably attached to the front wall. The transparent cover drives the preset pressure indicating member to set a preset pressure range between the first display section and the second display section which is observable from the outside through the transparent cover.

6 Claims, 14 Drawing Sheets

(56) References Cited

FOREIGN PATENT DOCUMENTS

| | | | |
|---|---|---|---|
| JP | 62132440 U | * | 6/1987 |
| JP | S62132440 | | 8/1987 |
| JP | H357622 | | 6/1991 |
| JP | 6160213 A | | 6/1994 |
| JP | 6052215 B | | 7/1994 |
| JP | 11030562 A | | 2/1999 |
| JP | 3717621 B2 | | 11/2005 |
| JP | 2009063559 A | | 3/2009 |
| JP | 2010185666 A | | 8/2010 |
| WO | 2010092733 A1 | | 8/2010 |

OTHER PUBLICATIONS

Extended European Search Report, EP Application No. 13153499.2-1557, dated Nov. 10, 2014, pp. 1-8.

Extended European Search Report, EP Application No. 11809465.5-1557, dated Nov. 10, 2014, pp. 1-8.

* cited by examiner

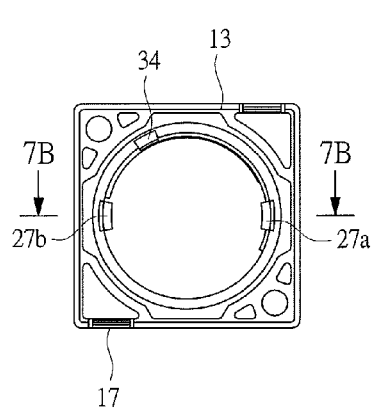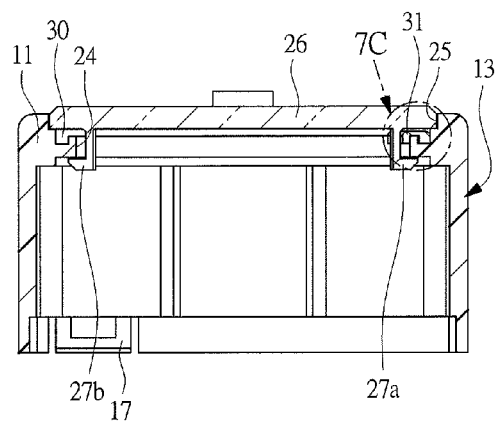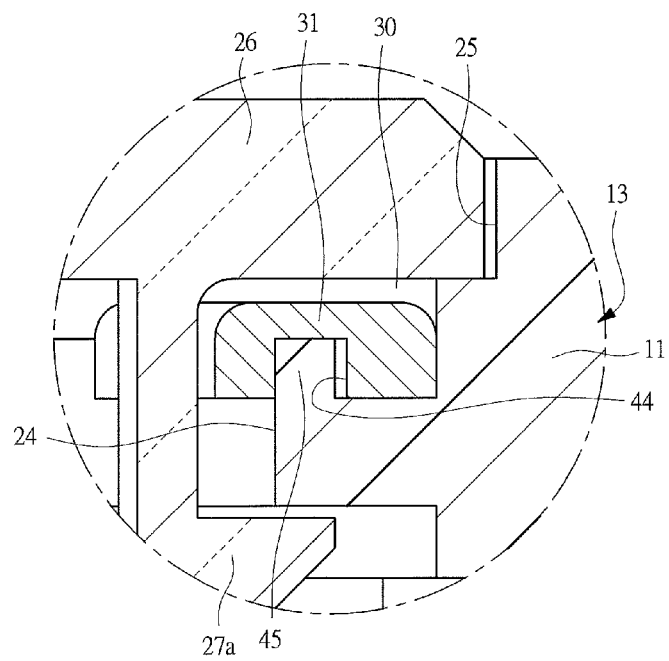

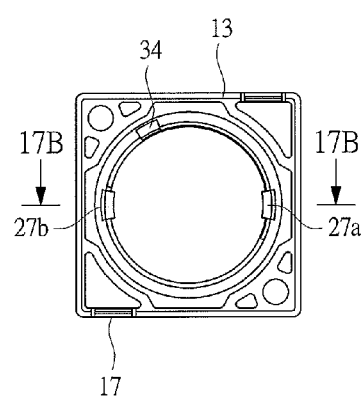
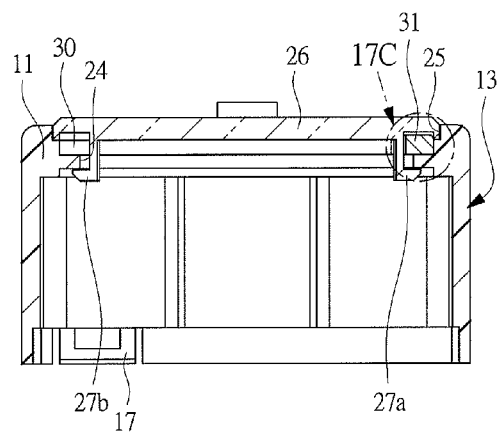
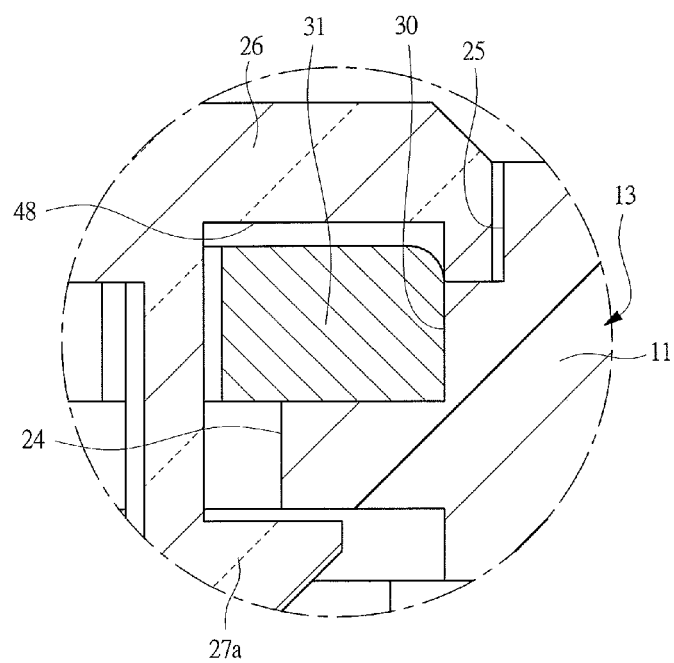

US 9,134,192 B2

PRESSURE GAUGE

TECHNICAL FIELD

The present invention relates to a pressure gauge which measures pressure of fluid supplied to a fluid pressure equipment, and which can arbitrarily set a preset pressure range indicated for fluid supplied to the fluid pressure equipment.

BACKGROUND ART

A pneumatic circuit for supplying compressed air from an air pressure source to an actuator such as a pneumatic cylinder includes a fluid pressure equipment which has a switching valve for switching a flow path, a pressure control valve for controlling pressure, a filter for removing dust, water and the like from the compressed air, and a pipe arrangement for connecting the above components. Similarly, a hydraulic circuit for supplying hydraulic pressure from a hydraulic pressure source to a hydraulic actuator includes a fluid pressure equipment such as a pressure control valve. A pressure gauge for measuring pressure of fluid is used in such a fluid pressure equipment included in a fluid pressure circuit for driving an actuator which is actuated by air pressure or hydraulic pressure as described above.

There is an analog pressure gauge which displays measured pressure using an indicator needle, and a Bourdon tube type pressure gauge provided with a Bourdon tube is frequently used in this type of pressure gauge. In an analog pressure gauge provided with an indicator needle, a scale based on a measurable range of the pressure gauge is marked as a pressure scale of a scale plate indicated by the indicator needle so that the pressure gauge can be used for various fluid pressure circuits. For example, in a pressure gauge used in a pneumatic circuit, a pressure scale based on a measurable range from a minimum value of 0 Mega Pascal (MPa) to a maximum value of several MPa is marked. However, in many cases, air pressure actually supplied to a pneumatic circuit is within a range smaller than a measurable range of the pressure gauge. For example, even if up to 1.0 MPa can be measured by a pressure gauge, in a pneumatic circuit, the pressure gauge may be used within an operating pressure range between 0.4 MPa and 0.6 MPa. In such a case, it is necessary for an operator to check whether or not air pressure supplied to each pneumatic device included in the pneumatic circuit is within a designated operating pressure range by observing the pressure gauge.

Japanese Patent No. 3717621 and Japanese Patent Application Laid-Open Publication No. 06-52215 disclose a pressure gauge provided with a preset marker indicating a pressure range.

A pressure gauge described in Japanese Patent No. 3717621 includes a front cover covering an indicator needle and formed with a transparent circular plate provided with a scale of measurable range, and an opaque holding member for holding the transparent circular plate. Two preset markers are movably provided to correspond to an upper limit value and a lower limit value of a preset pressure range in a gap between the holding member and the circular plate, and each preset marker is disposed on the rear surface side of the scale and protrudes toward the rear surface of the front cover.

In this way, when the preset markers are disposed on the rear surface side of the transparent circular plate provided with the scale of measurable range, the preset markers are overlapped with the scale. Therefore, to check whether or not the indicator needle is located within a preset pressure range, it is necessary to visually check the preset markers that display the upper limit value and the lower limit value through the scale, so there is a problem that it is difficult to identify the preset pressure range at first glance. Furthermore, to change the preset pressure range, it is necessary to remove the front cover and adjust the positions of the preset markers on the rear surface side of the front cover. Therefore, to check whether the adjusted positions are appropriate or not, it is necessary to reverse the front cover and check the positional relationship between the positions of the preset markers and the scale from the front side, so the change of the preset pressure range is troublesome.

On the other hand, a pressure gauge described in Japanese Patent Application Laid-Open Publication No. 06-52215 includes a scale plate provided with a scale of measurable range and a pair of cover plates rotatably attached along the outer circumferential portion of the scale plate. A display band is formed on the outer circumferential portion of the scale plate, and the preset pressure range is displayed by an area of the display band which is not covered by the cover plates by relatively rotating the pair of cover plates that partially cover the display band.

In this way, the cover plates are disposed on the front side of the scale plate and the cover plates are supported by the scale plate, an excessive load is applied to the scale plate during a rotation operation of the cover plates, and there is a risk that the scale plate is deformed or damaged. Therefore, it is necessary to increase the strength of the scale plate by forming the scale plate using a metal material or unduly firmly fix the scale plate. As a result, the fixing operation of the scale plate becomes complex and the cost of the operation increases.

SUMMARY OF THE INVENTION

An object of the present invention is to easily change a preset pressure range in a measurable range of a pressure gauge and improve visibility of the preset pressure range.

Another object of the present invention is to prevent the pressure gauge from being deformed or damaged by an excessive load applied when setting a preset pressure range.

A pressure gauge according to the present invention includes an indicator needle to be rotated by an angle corresponding to pressure of fluid, and a scale plate marked with a pressure scale which is indicated by the indicator needle along a rotation path of the indicator needle, the pressure gauge comprising: a pressure gauge main body including the scale plate and the indicator needle, and being provided with a pressure measuring device configured to rotate the indicator needle corresponding to the pressure of fluid; a front wall formed with a circular guide hole and attached to the pressure gauge main body, the scale plate being exposed to the outside through the circular guide hole; an arc-shaped preset pressure indicating member extending along the pressure scale in a circular arc pattern, and being provided with a first display section at one end thereof, the preset pressure indicating member being slidably attached to the front wall along the guide hole; a transparent cover rotatably attached to the front wall, and configured to cover the preset pressure indicating member and the scale plate; an opaque shield portion extending along the pressure scale in a circular arc pattern, and being provided to the transparent cover, and provided with a second display section at one end thereof; and a driving pawl portion provided to the transparent cover, and configured to come into contact with a driven pawl portion provided to the preset pressure indicating member to have the preset pressure indicating member perform a following rotation, wherein one of the front wall and the preset pressure indicating member is formed with a guide groove, the other of the front wall and the preset pressure indicating member is formed with a guide protrusion which is mounted and slidably movable in the guide groove, when the preset pressure indicating member is rotated in one direction via the transparent cover to set a position of the first display section, and the transparent cover is then rotated in the reverse direction to set a position of the second display section, the preset pressure indicating member has an area which is not covered by the shield portion, the area being displayed to the outside through the transparent cover.

In the pressure gauge according to the present invention, the preset pressure indicating member is formed with a guide groove, the front wall is provided with a guide protrusion, and the rotation of the preset pressure indicating member is guided by the guide protrusion. In the pressure gauge according to the present invention, the front wall is formed with a guide groove, the preset pressure indicating member is provided with a guide protrusion, and the rotation of the preset pressure indicating member is guided by the guide groove.

A pressure gauge according to the present invention comprises an indicator needle to be rotated by an angle corresponding to pressure of fluid, and a scale plate marked with a pressure scale which is indicated by the indicator needle along a rotation path of the indicator needle, the pressure gauge comprising: a pressure gauge main body including the scale plate and the indicator needle, and being provided with a pressure measuring device configured to rotate the indicator needle corresponding to the pressure of fluid; a front wall formed with a circular guide hole and attached to the pressure gauge main body, the scale plate being exposed to the outside through the circular guide hole; an arc-shaped preset pressure indicating member extending along the pressure scale in a circular arc pattern, and being provided with a first display section at one end thereof, the preset pressure indicating member being slidably attached to the front wall along the guide hole; a transparent cover rotatably attached to the front wall, and configured to cover the preset pressure indicating member and the scale plate; an opaque shield portion extending along the pressure scale in a circular arc pattern, and being provided to the transparent cover, and provided with a second display section at one end thereof; and a driving pawl portion provided to the transparent cover, and configured to come into contact with a driven pawl portion provided to the preset pressure indicating member to have the preset pressure indicating member perform a following rotation, wherein the transparent cover is formed with a guide groove in which the preset pressure indicating member is mounted and slidably movable, when the preset pressure indicating member is rotated in one direction via the transparent cover to set a position of the first display section, and the transparent cover is then rotated in the reverse direction to set a position of the second display section, the preset pressure indicating member has an area which is not covered by the shield portion, the area being displayed to the outside through the transparent cover.

In the pressure gauge according to the present invention, the transparent cover is provided with an operational portion for a rotation operation. In the pressure gauge according to the present invention, the transparent cover is provided with a plurality of driving pawl portions, the driving pawl portions are engaged with the rear surface of the front wall, and the transparent cover is rotatably attached to the front wall by the driving pawl portions.

According to the present invention, when a transparent cover is rotated in one direction and a preset pressure indicating member is driven by the transparent cover, a position of a first display section is set, when the transparent cover is rotated in the reverse direction, a position of a second display section is set, and a preset pressure range in the measurable range of the pressure gauge is displayed to the outside by an area between the first display section and the second display section. Therefore, the preset pressure range can be easily changed by the rotation operation of the transparent cover.

A portion of the preset pressure indicating member, which is located between the first display section and the second display section, is observed from the outside through the transparent cover, so the visibility of the preset pressure range is improved and an operator can check whether or not the indicator needle is within the preset pressure range at first glance.

When setting the preset pressure range, an external force is not applied to the scale plate, so there is no risk that the scale plate is deformed or damaged, and the durability of the pressure gauge can be improved.

BRIEF DESCRIPTIONS OF THE DRAWINGS

FIG. 7A is a rear view showing the case with the transparent cover being rotated by a predetermined angle from its position shown in FIG. 6A;

FIG. 7B is an enlarged cross-sectional view showing the case along a line 7B-7B shown in FIG. 7A;

FIG. 7C is an enlarged cross-sectional view showing a 7C portion in FIG. 7B;

FIG. 17A is a rear view showing the case of the pressure gauge with the transparent cover and the preset pressure indicating member shown in FIG. 15 being mounted on it;

FIG. 17B is an enlarged cross-sectional view showing the pressure gauge along a line 17B-17B in FIG. 17A; and FIG. 17C is an enlarged cross-sectional view showing a 17C portion in FIG. 17B.

DETAILED DESCRIPTION

Figure 1:
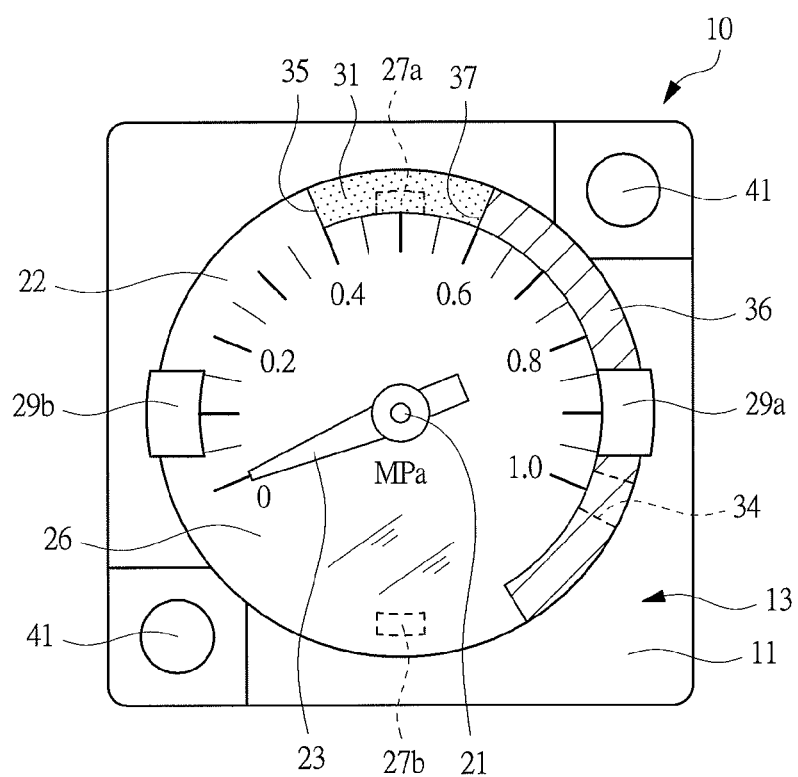
FIG. 1 is a front view showing a pressure gauge according to one embodiment of the present invention.
Figure 2:
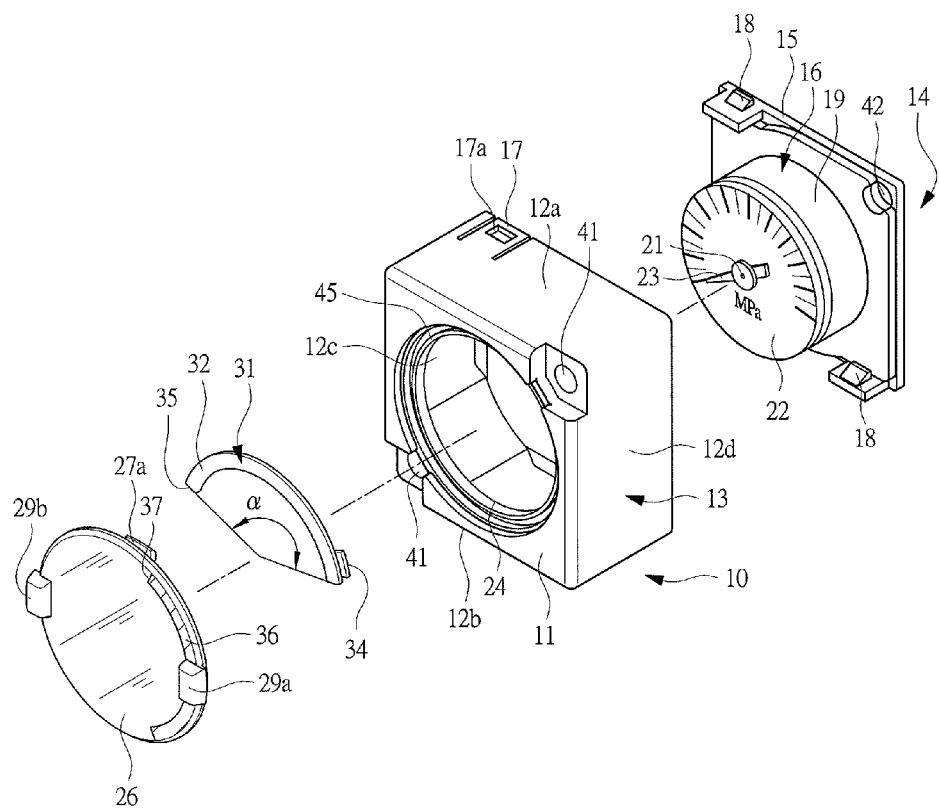
FIG. 2 is an exploded front perspective view showing the pressure gauge shown in FIG. 1.
Figure 3:
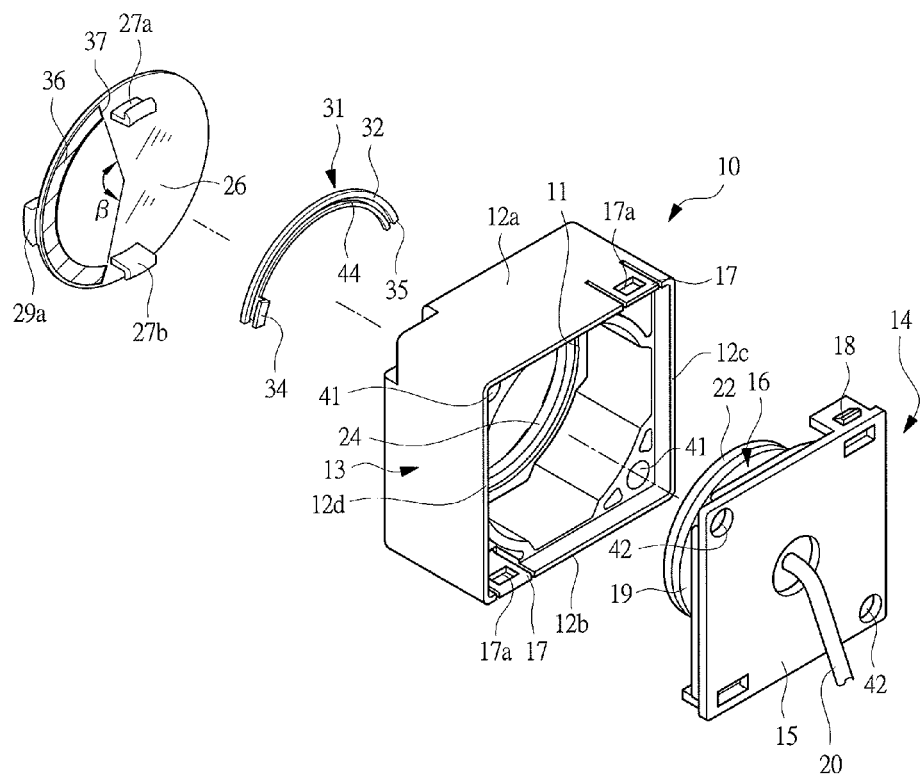
FIG. 3 is an exploded rear perspective view showing the pressure gauge shown in FIG. 1.
Figure 4:
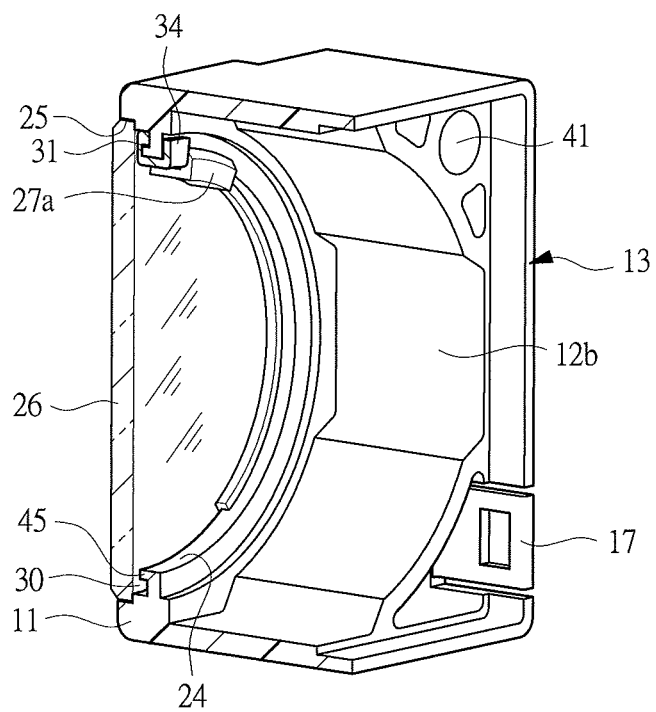
FIG. 4 is a perspective cutaway view showing a case of the pressure gage with a transparent cover and a preset pressure indicating member being mounted on it.

Hereinafter, embodiments of the present invention will be described in detail with reference to the drawings. As shown in FIGS. 1 to 3, a pressure gauge 10 has a resin case 13 which includes a rectangular front wall 11 and four side walls 12a to 12d on the left, right, top and bottom thereof. The case 13 has a rectangular solid shape as a whole, and opens on the rear surface. As shown in FIGS. 2 to 3, a pressure gauge main body 14 installed in the case 13 has a resin support plate 15 which contacts with the rear surface of the case 13, and the support plate 15 is provided with a pressure measuring device 16. Tab portions 17 are provided to the top and bottom side walls 12a and 12b of the case 13, and protrude backward from respective side walls. Engaging protrusions 18 are provided to the support plate 15 so as to correspond to the respective tab portions 17. When the support plate 15 comes into contact with the case 13, the engaging protrusions 18 engage with respective engaging holes 17a of the tab portions 17, and the pressure gauge main body 14 is attached to the case 13.

As shown in FIGS. 2 to 3, the pressure measuring device 16 has a substantially columnar shape, and the case 13 has a cylindrical container hole in which the pressure measuring device 16 is accommodated. The four corners of the case 13 are larger in thickness than the remaining part of the case 13.

The pressure measuring device 16 has a flat Bourdon tube 19 bent into a circular arc shape and the pressure gauge 10 is a Bourdon tube type pressure gauge. The base end portion of the Bourdon tube 19 is fixed to the support plate 15, and the top end portion is connected to a mechanical unit not shown in the drawings. A fluid guide tube 20 for guiding fluid to the Bourdon tube 19 is attached to the Bourdon tube 19 as shown in FIG. 3, and the fluid guide tube 20 projects outward from the rear of the support plate 15. When the top end portion of the Bourdon tube 19 is displaced by pressure of a fluid supplied into the Bourdon tube 19 through the fluid guide tube 20, the displacement is enlarged by the mechanical unit and transmitted to a rotating shaft 21.

A circular scale plate 22 is attached to the support plate 15, and a pressure scale based on a measureable range of the pressure gauge 10 is radially marked on the scale plate 22. This pressure gauge 10 ranges from 0 to 1.0 Mega Pascal (MPa). Numbers indicating a pressure value are marked on the scale plate 22 for every 0.2 MPa in addition to the pressure scale. An indicator needle 23 is attached to the rotating shaft 21 and the indicator needle 23 rotates by a degree corresponding to the pressure of the fluid guided into the Bourdon tube 19. Thereby, the measured pressure of the fluid is displayed to an outside observer by a position of the indicator needle 23 that points a pressure scale provided along the path of the indicator needle 23.

Figure 5A:
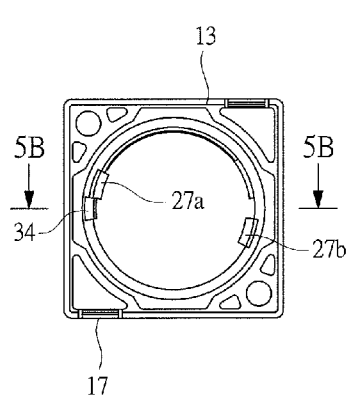
FIG. 5A is a rear view showing the case of the pressure gauge with the transparent cover and the preset pressure indicating member being mounted on it.
Figure 5B:
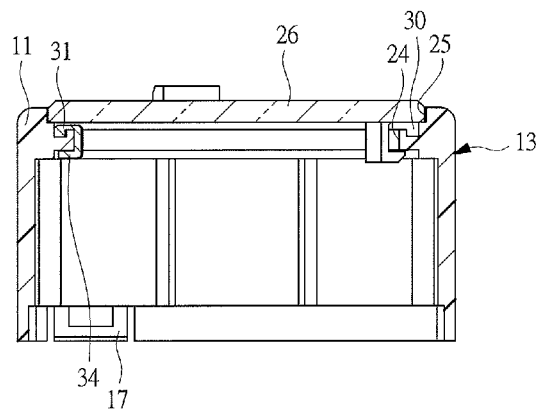
FIG. 5B is an enlarged cross-sectional view showing the case along a line 5B-5B shown in FIG. 5A.
Figure 6A:
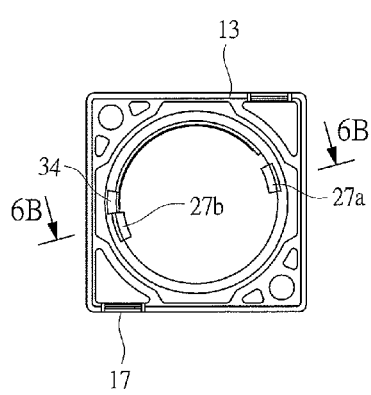
FIG. 6A is a rear view showing the case with the transparent cover being rotated by a predetermined angle from its position shown in FIG. 5A.
Figure 6B:
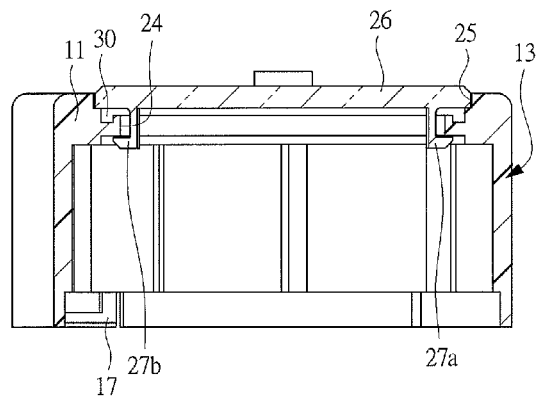
FIG. 6B is an enlarged cross-sectional view showing the case along a line 6B-6B shown in FIG. 6A.

As shown in FIGS. 2 and 3, a circular guide hole 24 is formed on the front wall 11. When the pressure gauge main body 14 is attached to the case 13, as shown in FIG. 1, the scale plate 22 is visible from an operator through the guide hole 24. As shown in FIGS. 5 to 7, a ring-shaped concave portion 25 larger in diameter than the guide hole 24 is formed in the front wall 11 and located near the outside, that is, the front side as compared with the guide hole 24, and a circular transparent cover 26 formed of transparent resin material is rotatably attached to the ring-shaped concave portion 25. As shown in FIG. 3, two pawl portions 27a and 27b which are engaged with the rear surface of the front wall 11 are provided on the rear surface, that is, the inner surface of the transparent cover 26, spaced from each other by about 180 degrees in the circumferential direction, and protrude inwardly. By engaging the pawl portions 27a and 27b with the rear surface of the front wall 11, the transparent cover 26 is prevented from being detached from the front wall 11, and the transparent cover 26 is rotatably attached to the front wall 11.

As shown in FIGS. 1 and 2, operational protrusion portions 29a and 29b, which are operated by an operator when rotating the transparent cover 26, are provided as operational portions on an outer circumferential portion of the outer surface of the transparent cover 26, spaced from each other in the circumferential direction by about 180 degrees, and protrude outwardly in the circumferential direction. The protrusion portions 29a and 29b are away from the pawl portions 27a to 27b by about 90 degrees in the circumferential direction. The operator can rotate the transparent cover 26 by holding the protrusion portions 29a and 29b between the tips of his/her thumb and forefinger. As an operational portion, a concave portion may be provided to the transparent cover 26 instead of the protrusion portions 29a and 29b. In this case, the rotation operation of the transparent cover 26 is performed by hooking a tool into the concave portion.

As shown in FIGS. 5A to 7B, a ring-shaped concave portion 30 larger in inner diameter than the guide hole 24 and smaller in inner diameter than the ring-shaped concave portion 25 is formed between the inner circumferential surface of the guide hole 24 and the ring-shaped concave portion 25 on the front wall 11. As shown in FIG. 7C, an arc-shaped preset pressure indicating member 31 is slidably attached along the guide hole 24 in the ring-shaped concave portion 30. The preset pressure indicating member 31 is made of resin, and as shown in FIGS. 2 and 3, includes a display band portion 32 facing the rear surface of the transparent cover 26. The arc-shaped display band portion 32 is disposed so as to overlap an outer circumferential portion of the transparent cover 26 and located radially outside the pressure scale marked on the scale plate 22.

As shown in FIGS. 7A to 7C, the rear surface of the preset pressure indicating member 31 is formed with an arc-shaped guide groove 44 located on its radially center portion, and the guide groove 44 opens on the rear surface throughout all parts in a circumferential direction of the preset pressure indicating member 31. The front wall 11 is formed with a ring-shaped guide protrusion 45 which corresponds to the guide groove 44, and the guide protrusion 45 protrudes along the guide hole 24 on the front surface side, and protrudes into the ring-shaped concave portion 30. The guide protrusion 45 is designed to be slidably mounted in the guide groove 44 when the preset pressure indicating member 31 is slidably attached in the ring-shaped concave portion 30. When the preset pressure indicating member 31 is slid with respect to the front wall 11 with the rotation of the transparent cover 26, the rotation of the preset pressure indicating member 31 is guided by the guide protrusion 45. That is, since the guide groove 44 of the preset pressure indicating member 31 is slid along the guide protrusion 45 on the front wall 11 when the preset pressure indicating member 31 is rotated, the preset pressure indicating member 31 is guided in a circumferential direction. Since the preset pressure indicating member 31 is provided on the inside of the transparent cover 26, the preset pressure indicating member 31 and the scale plate 22 are covered with the transparent cover 26, and the pressure scale provided on the scale plate 22 is observed from the outside through the transparent cover 26.

The preset pressure indicating member 31 has a length extending circumferentially by an angle of a around the rotation center, and the angle of a is about 140 degrees. As shown in FIGS. 5A and 5B, a pawl portion 34 to be engaged with the rear surface of the front wall 11 is provided at the base end portion of the preset pressure indicating member 31. By engaging the pawl portion 34 with the rear surface of the front wall 11, the preset pressure indicating member 31 is slidably attached to the front wall 11.

The preset pressure indicating member 31 is formed of a material different in color from the case 13. Therefore, the preset pressure indicating member 31 is clearly observed through the transparent cover 26 when the pressure gauge 10 is observed from the outside. For example, when the case 13 is gray or white, the preset pressure indicating member 31 may be green, red, black, or the like so as to clearly differ in color from the case 13. As part of the preset pressure indicating member 31, the front surface of the display band portion 32 is observed from the outside. If the preset pressure indicating member 31 is manufactured of a material similar in color to the case 13, a paint having a color such as green, different from that of the case 13, is put on the front surface of the display band portion 32. The top edge of the preset pressure indicating member 31, that is, the edge of the left end portion (counterclockwise direction) of the preset pressure indicating member 31 in FIG. 1 is a first display section 35, and the first display section 35 displays a minimum value in the preset pressure range.

The first display section 35 may be formed by radially providing a line along one edge of the preset pressure indicating member 31 without defining one edge of the preset pressure indicating member 31 as the first display section 35. In this case, the color of the preset pressure indicating member 31 may be the same as the color of the case 13. The preset pressure indicating member 31 may be formed longer than the length shown in the drawings and only the area indicating the preset pressure range may be colored. In this case, a contour line of one edge of the colored area is defined as the first display section 35.

As shown in FIGS. 1 to 3, a circular arc opaque shield portion 36 is provided along the pressure scale at the outer circumferential portion of the transparent cover 26. The shield portion 36 is the same in distance from the rotation center as the preset pressure indicating member 31. The shield portion 36 can overlap the display band portion 32 and is arranged radially outside the pressure scale provided on the scale plate 22. Further, the shield portion 36 extends in a direction of a circular arc by an angle "β" around the rotation center, and the angle "β" is about 140 degrees corresponding to the preset pressure indicating member 31. Therefore, the preset pressure indicating member 31 can be entirely covered by the shield portion 36 when the transparent cover 26 is rotated by a specific angle. The shield portion 36 is painted in color different from the color of the surface of the preset pressure indicating member 31 on the rear surface of the transparent cover 26, and the shield portion 36 is observed from the outside of the transparent cover 26 made of a transparent material.

It is preferable that the shield portion 36 be similar in color to the case. Additionally, the shield portion 36 may be formed by painting on the front surface of the transparent cover 26. A circular arc tape may be attached to the front surface or the rear surface of the transparent cover 26 to from the shield portion 36 instead of painting it.

As shown in FIGS. 1 and 2, two corners selected as a diagonal pair from among four corners of the front wall 11 are respectively provided with attaching holes 41 in which bolts not shown in the drawings are inserted for mounting the pressure gauge 10. The support plate 15 is provided with through-holes 42 corresponding to the attaching holes 41. Front side portions of the attaching holes 41 of the front wall 11 are formed with respective rectangular grooves in which the heads of the bolts are received.

An edge of the left end portion (counterclockwise direction) of the shield portion 36 in FIG. 1 is defined as a second display section 37 for indicating a maximum value of the preset pressure range. Therefore, the preset pressure indicating member 31 is slid along the guide hole 24 to set the position of one end surface of the preset pressure indicating member 31, that is, the first display section 35, and the transparent cover 26 is rotated to set the position of the edge of one end surface of the shield portion 36, that is, the second display section 37. With this, an area of the preset pressure indicating member 31 which is not covered by the shield portion 36, that is, an area between the first display section 35 and the second display section 37 is displayed to the outside through the transparent cover 26. As shown in FIG. 1, 0.4 MPa is displayed as the minimum value of the operating pressure by the first display section 35 and 0.6 MPa is displayed as the maximum value of the operating pressure by the second display section 37, and the range between these pressure values is the preset pressure range.

The pawl portions 27a and 27b provided on the rear surface of the transparent cover 26 are in contact with the rear surface of the front wall 11, and the pawl portion 34 provided on the preset pressure indicating member 31 is also in contact with the rear surface of the front wall 11. Therefore, when the transparent cover 26 is rotated, the pawl portions 27a and 27b of the transparent cover 26 come into contact with the pawl portion 34 of the preset pressure indicating member 31, and the preset pressure indicating member 31 is driven along the guide hole 24 by the transparent cover 26. In this way, the pawl portions 27a and 27b of the transparent cover 26 are formed as driving pawl portions and the pawl portion 34 of the preset pressure indicating member 31 is formed as a driven pawl portion.

As shown in FIG. 1, the pressure gauge 10 has a measurable range from 0 to 1.0 MPa (Mega Pascal). For example, when a pneumatic circuit provided with the pressure gauge 10 is used within an air pressure range from 0.4 to 0.6 MPa, to easily observe whether or not the pressure in the pneumatic circuit is within the range, a preset pressure range between the first display section 35 and the second display section 37 that is further displayed to the outside is set.

Figure 8A:
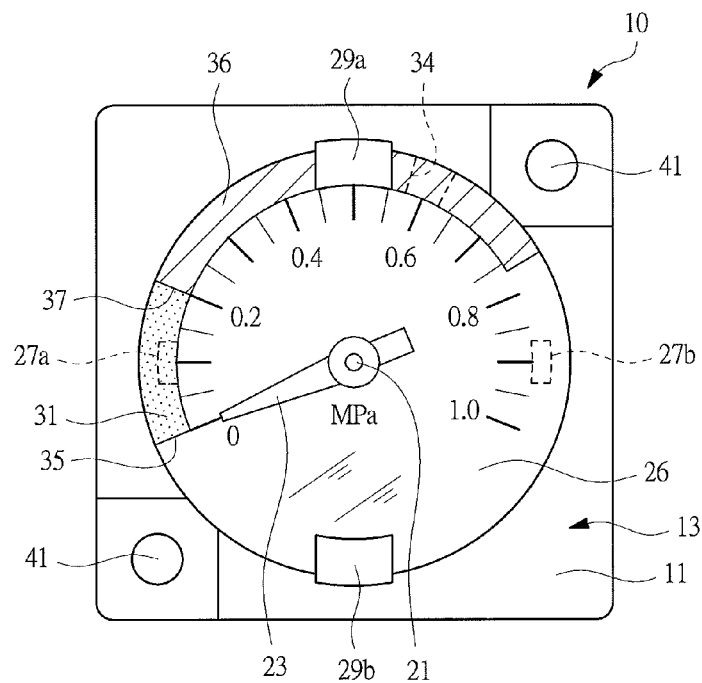
FIG. 8A is a front view explaining a setting procedure of the preset pressure range of the pressure gauge shown in FIG. 1.
Figure 8B:
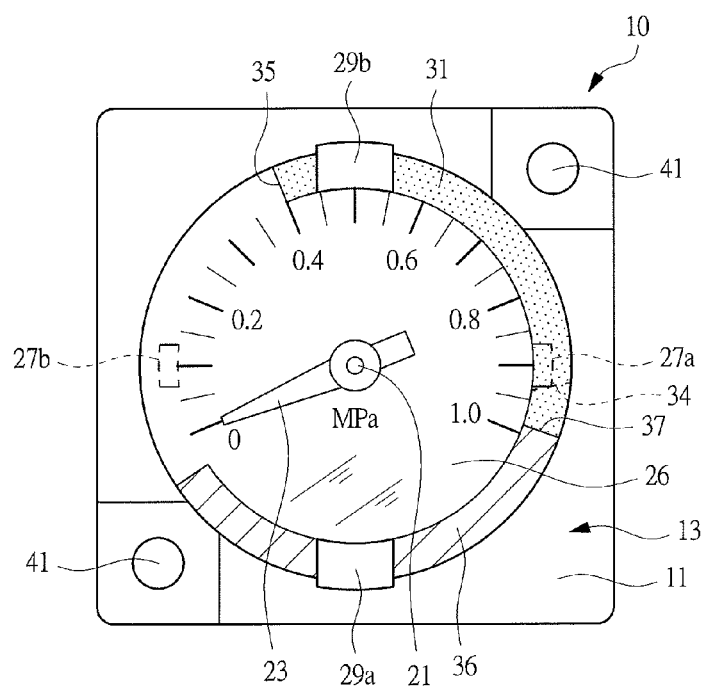
FIG. 8B is a front view explaining a setting procedure of the preset pressure range of the pressure gauge shown in FIG. 1.

FIGS. 8A and 8B is a front view showing a setting procedure of the preset pressure range. For example, as shown in FIG. 8A, the first display section 35 is disposed at a position corresponding to 0 Mpa, and the second display section 37 is disposed at a position corresponding to 0.2 Mpa. In this state, when a preset pressure range is set to a range from 0.4 MPa to 0.6 MPa, an operator firstly places his fingers on the protrusions 29a and 29b and rotates the transparent cover 26 in one direction, that is, in the clockwise direction in FIG. 8A. As a result, the driving pawl portion 27a comes into contact with the driven pawl portion 34, and the preset pressure indicating member 31 is driven in the clockwise direction along the guide hole 24 by the transparent cover 26. FIG. 8B is a front view showing that the preset pressure indicating member 31 is driven by the transparent cover 26 until the first display section 35 comes to the position of 0.4 MPa by rotating the transparent cover 26 in the clockwise direction. When the preset pressure indicating member 31 is driven to the position, the driving pawl portion 27a is in contact with the driven pawl portion 34.

In this state, when the operator rotates the transparent cover 26 by operating the protrusion portion 29a and 29b in the direction reverse to the direction described above, that is, in the counterclockwise direction in FIG. 8B, the driving pawl portion 27a is detached from the driven pawl portion 34 and only the transparent cover 26 is driven in the counterclockwise direction. When the transparent cover 26 is rotated until the second display section 37 comes to the position of 0.6 MPa, as shown in FIG. 1, an area of the preset pressure indicating member 31 between the first display section 35 and the second display section 37 is exposed to the outside through the transparent cover 26, and the remaining area is covered by the shield portion 36. Thereby, as shown in FIG. 1, the first display section 35 comes to the position of 0.4 MPa and the second display section 37 comes to the position of 0.6 MPa, so the preset pressure range of the preset pressure indicating member 31 is exposed to the outside through the transparent cover 26, and as shown in FIG. 1, the preset pressure range is set to 0.4 MPa to 0.6 MPa.

In this way, to set the minimum value of the preset pressure range by the first display section 35, with the first display section 35 being at a position of pressure lower than the minimum value set by the first display section 35, the transparent cover 26 is rotated in the clockwise direction to rotate the preset pressure indicating member 31 until the first display section 35 comes to the position of the minimum value set by the first display section 35. On the other hand, when the first display section 35 is at a position of pressure higher than the minimum value set by the first display section 35, the transparent cover 26 is rotated in the counterclockwise direction to drive the preset pressure indicating member 31 until the first display section 35 comes to the position of the minimum value set by the first display section 35 or a position of pressure lower than that. At this time, the driving pawl portion 27b comes into contact with the driven pawl portion 34, and the rotation of the transparent cover 26 is transmitted to the preset pressure indicating member 31. Under this state, the transparent cover 26 is rotated in the clockwise direction. After the minimum value of the preset pressure range is displayed by the first display section 35, as described above, to set the second display section 37 to the position of the maximum value set by the second display section 37, the transparent cover 26 is rotated in the clockwise direction.

In the pressure gauge 10 shown in the drawings, two pawl portions 27a and 27b are provided as the driving pawl portions. Therefore, when the transparent cover 26 is rotated in the clockwise direction, the pawl portion 27a comes into contact with the pawl portion 34. When the transparent cover 26 is rotated in the counterclockwise direction, the pawl portion 27b comes into contact with the pawl portion 34. If three pawl portions are provided on the rear surface of the transparent cover 26 at the same interval in the circumferential direction, two pawl portions adjacent to each other in the circumferential direction of the pawl portion 34 come into contact with the pawl portion 34, and the remaining pawl portion is used as a member for rotatably guiding the transparent cover 26 on the front wall 11.

Figure 9:
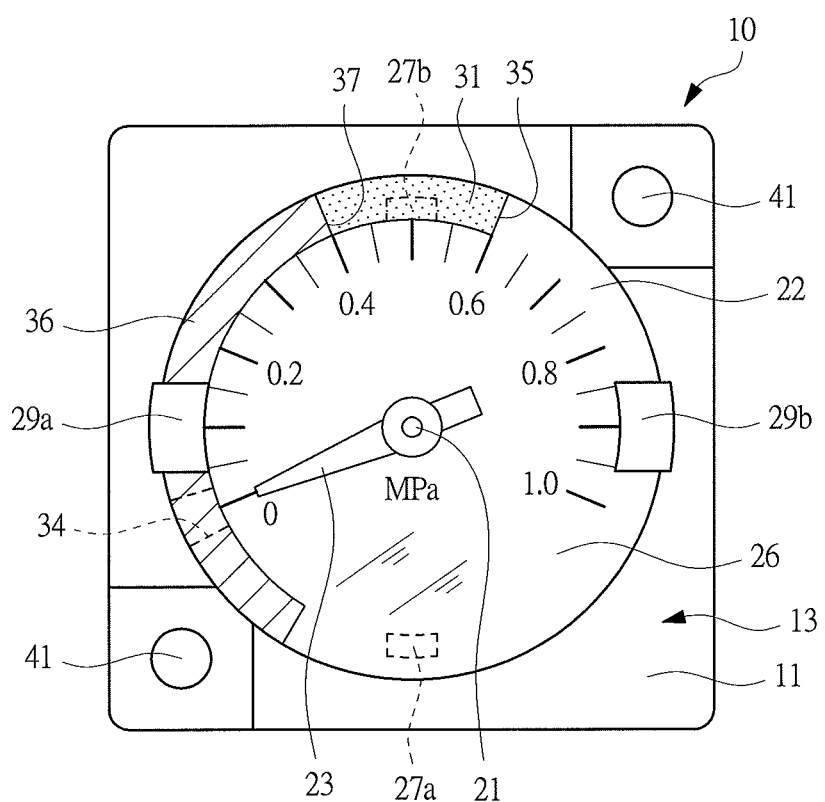
FIG. 9 is a front view showing a pressure gauge according to another embodiment of the present invention.

FIG. 9 is a front view showing a pressure gauge 10 of another embodiment of the present invention. In this pressure gauge 10, the arrangement relationship between the shield portion 36 provided on the transparent cover 26 and the preset pressure indicating member 31 is reverse to that of the pressure gauge 10 shown in FIG. 1. In the pressure gauge 10 of this type, the first display section 35 of the preset pressure indicating member 31 is configured to display the maximum value of the preset pressure range, and the second display section 37 of the shield portion 36 is configured to display the minimum value of the preset pressure range. Therefore, a procedure of setting the preset pressure range of the pressure gauge 10 is different from that of the pressure gauge 10 shown in FIG. 1, that is, the preset pressure indicating member 31 is slid by the rotation of the transparent cover 26 to display the maximum value, the transparent cover 26 is rotated to display the minimum value.

Figure 10A:
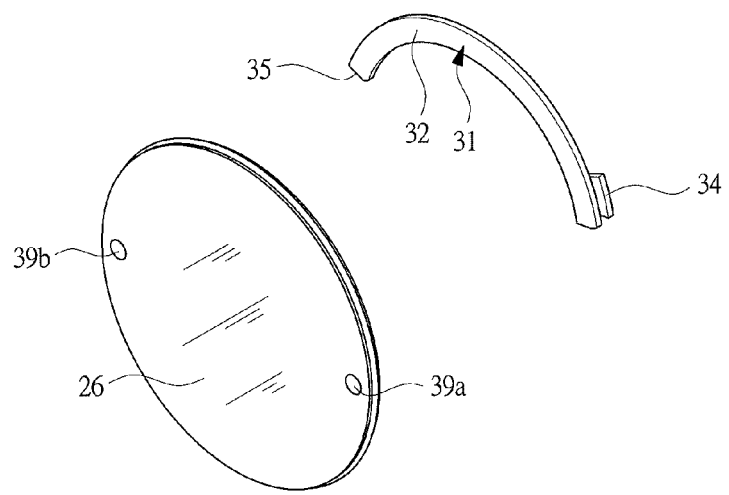
FIG. 10A is a front perspective view showing a transparent cover and a preset pressure indicating member in the pressure gauge according to another embodiment of the present invention.
Figure 10B:
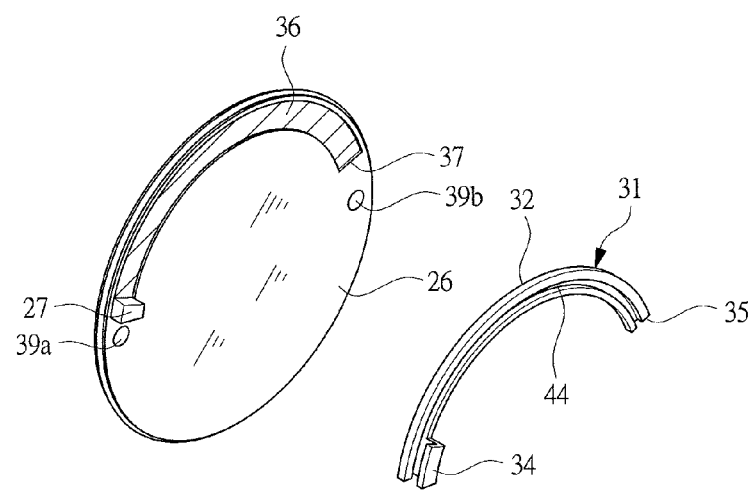
FIG. 10B is a rear perspective view showing those elements shown in FIG. 10A.
Figure 11:
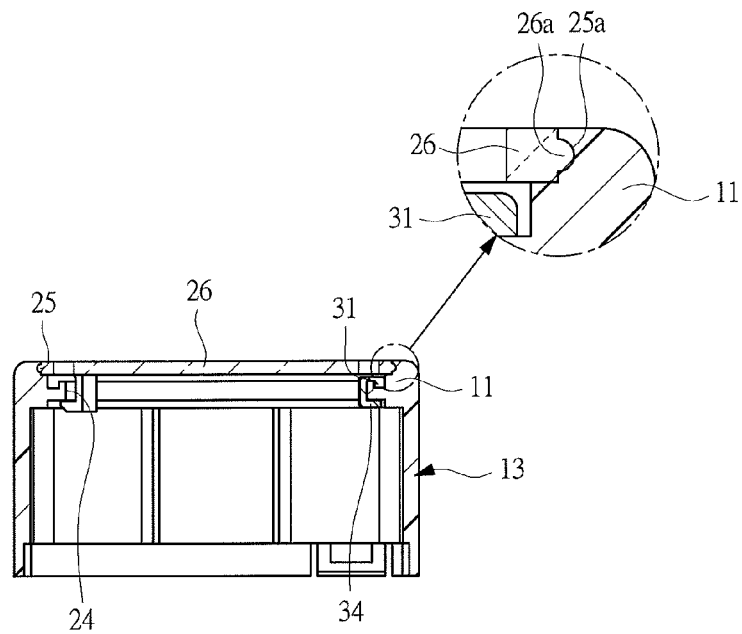
FIG. 11 is a cross-sectional view showing a case with the transparent cover and the preset pressure indicating member shown in FIG. 10.

FIGS. 10A and 10B is a perspective view showing the transparent cover 26 and the opaque shield portion 36 in the pressure gauge 10 according to still another embodiment of the present invention. FIG. 10A is a front perspective view showing those elements, while FIG. 10B is a rear perspective view showing those elements. FIG. 11 is a cross-sectional view showing the case to which the transparent cover 26 and the preset pressure indicating member 31 are attached.

Concave portions 39a and 39b are provided as operational portions on the front surface of the transparent cover 26 shown in FIGS. 10A, 10B and 11 unlike the transparent cover 26 shown in FIG. 1. Therefore, in the pressure gauge 10 of this type, the rotation operation of the transparent cover 26 is performed by hooking a tool into the concave portions 39a and 39b. Although the concave portions 39a and 39b are formed by through-holes in the transparent cover 26, the concave portions 39a and 39b may be formed by holes with bottoms. Furthermore, the preset pressure indicating member 31 is the same as that of the pressure gauge 10 in configuration as described above.

A convex portion 26a is formed on an outer circumferential surface of the transparent cover 26 shown in FIGS. 10A, 10B and 11, while a concave portion 25a is formed on an inner circumferential surface of the ring-shaped concave portion 25, and engaged with the convex portion 26a of the transparent cover 26. Therefore, without providing a plurality of pawl portions 27a and 27b to rotatably attach the transparent cover 26 to the guide hole 24 of the front wall 11 as in the case of the pressure gauge 10 shown in FIG. 1, the transparent cover 26 is rotatably attached to the front wall 11 by fitting the outer circumferential portion of the transparent cover 26 into the inner circumferential surface of the ring-shaped concave portion 25. In the pressure gauge 10 of this type, one pawl portion 27 is provided on the rear surface of the transparent cover 26 as a driving pawl portion. In both cases where the transparent cover 26 is pivoted in the clockwise direction and where the transparent cover 26 is pivoted in the counterclockwise direction, the pawl portion 27 comes into contact with the driven pawl portion 34, and the rotation of the transparent cover 26 is transmitted to slide the preset pressure indicating member 31. However, a plurality of pawl portions 27 having only the function as the driving pawl portion may be provided on the transparent cover 26 in the same manner as in the pressure gauge 10 shown in FIG. 1.

Figure 12:
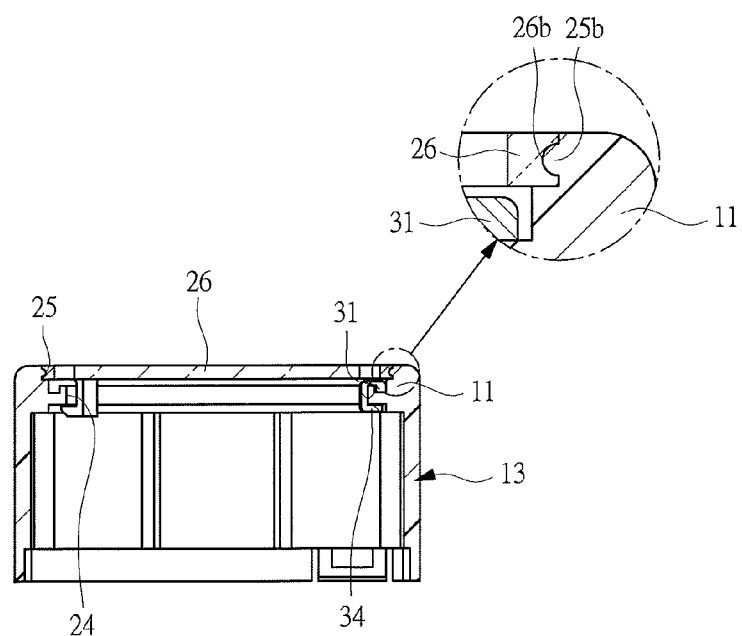
FIG. 12 is a cross-sectional view showing a case with a transparent cover and a preset pressure indicating member in a pressure gauge according to still another embodiment of the present invention.

FIG. 12 is a cross-sectional view showing a pressure gauge 10 of still another embodiment of the present invention, and FIG. 12 shows the same portion of the pressure gauge 10 as that in FIG. 11. Different from the pressure gauge 10 shown in FIGS. 10A, 10B and 11, in the transparent cover 26 of this pressure gauge 10, a concave portion 26b is formed on the outer circumferential surface of the transparent cover 26, and a convex portion 25b with which the concave portion 26b engages is formed on the inner circumference of the ring-shaped concave portion 25. In this way, when the outer circumferential portion of the transparent cover 26 is engaged with the ring-shaped concave portion 25, the outer circumferential surface of the transparent cover 26 may be a convex portion as shown in FIG. 11 and may be a concave portion as shown in FIG. 12.

Figure 13A:
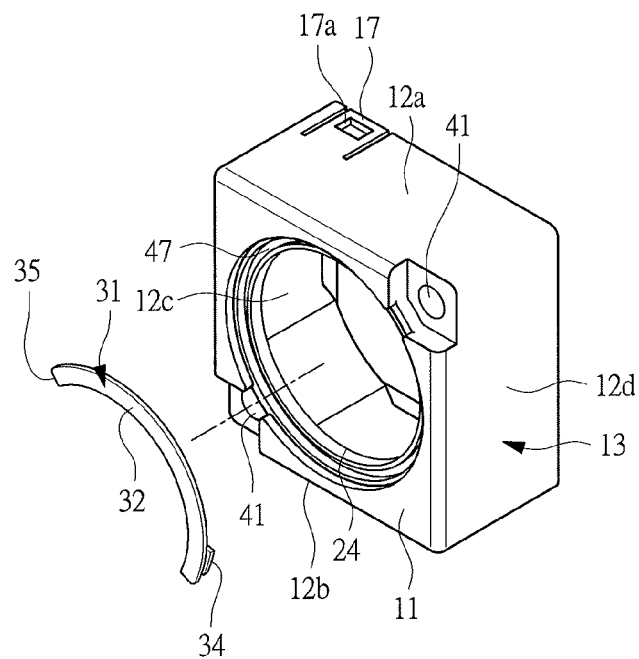
FIG. 13A is a front perspective view showing a case and a preset pressure indicating member in the pressure gauge according to still another embodiment of the present invention.
Figure 13B:
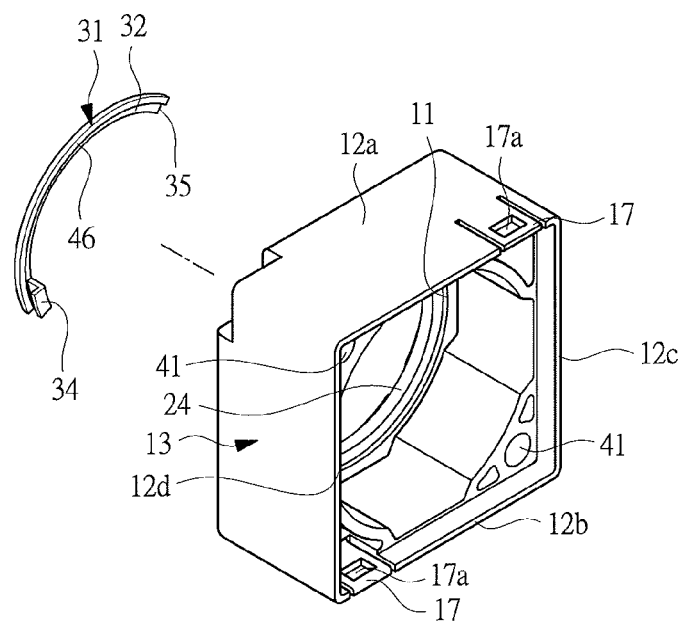
FIG. 13B is a rear perspective view showing those elements shown in FIG. 13A.
Figure 14A:
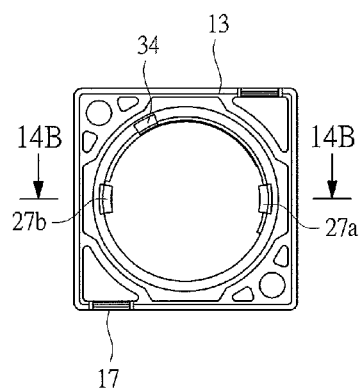
FIG. 14A is a rear view showing a case with the transparent cover and the preset pressure indicating member shown in FIGS. 13A and 13B being mounted on it.
Figure 14B:
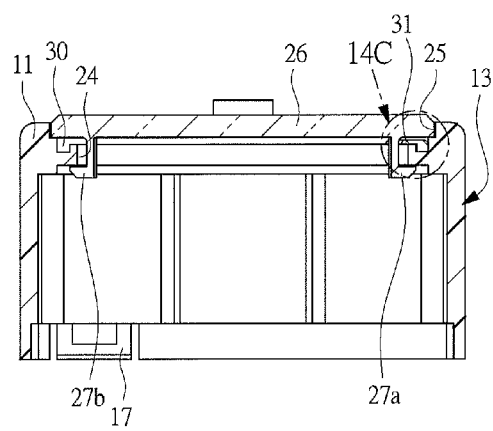
FIG. 14B is an enlarged cross-sectional view showing the pressure gauge along a line 14B-14B in FIG. 14A.
Figure 14C:
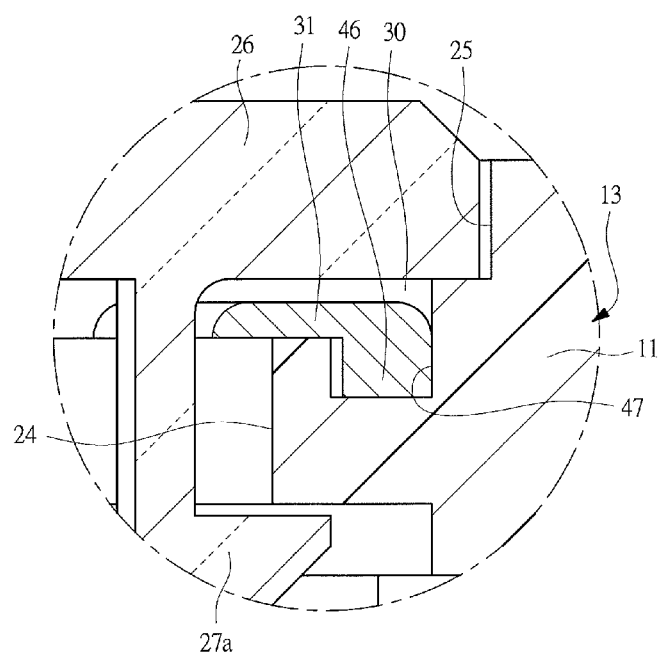
FIG. 14C is an enlarged cross-sectional view showing a 14C portion in FIG. 14B.

FIG. 13A is a front perspective view showing a case 13 and a preset pressure indicating member 31 in the pressure gauge 10 according to still another embodiment of the present invention, FIG. 13B is a rear perspective view showing those elements shown in FIG. 13A, FIG. 14A is a rear view showing a case with the transparent cover and the preset pressure indicating member shown in FIGS. 13A and 13B being mounted on it, FIG. 14B is an enlarged cross-sectional view showing the pressure gauge along a line 14B-14B in FIG. 14A, and FIG. 14C is an enlarged cross-sectional view showing a 14C portion in FIG. 14B.

The rear surface of the display band portion 32 of the preset pressure indicating member 31 shown in FIGS. 13A to 14C is formed with an arc-shaped guide protrusion 46 located on its radially outer peripheral portion, and the guide protrusion 46 protrudes on the rear surface side throughout all parts in a circumferential direction of the preset pressure indicating member 31. The front wall 11 is provided with a ring-shaped guide groove 47 concaved on the rear surface side, and the guide groove 47 corresponds to this guide protrusion 46, and opens on the rear surface toward the ring-shaped concave portion 30. The guide protrusion 46 is designed to be slidably mounted in the guide groove 47 when the preset pressure indicating member 31 is slidably attached in the ring-shaped concave portion 30. When the preset pressure indicating member 31 is slid with respect to the front wall 11 with the rotation of the transparent cover 26, the rotation of the preset pressure indicating member 31 is guided by the guide groove 47. That is, since the guide protrusion 46 of the preset pressure indicating member 31 is slid along the guide groove 47 of the front wall 11 when the preset pressure indicating member 31 is rotated, the preset pressure indicating member 31 is guided in a circumferential direction. In this way, as shown in FIGS. 7A to 7C, the preset pressure indicating member 31 may be formed with a guide groove 44, and provided with a guide protrusion 45, or as shown in FIGS. 14A to 14C, the preset pressure indicating member 31 may be provided with a guide protrusion 46, and provided with a guide groove 47.

Figure 15:
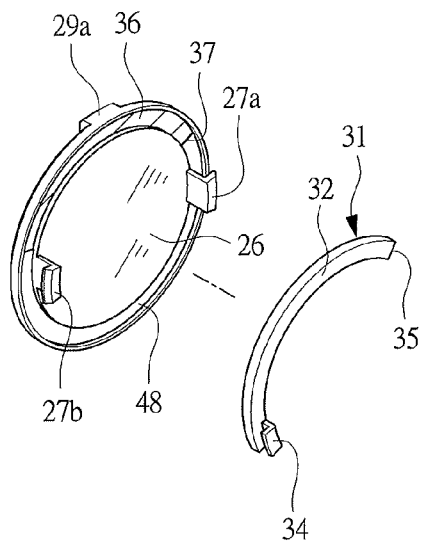
FIG. 15 is a rear perspective view showing a transparent cover and a preset pressure indicating member in the pressure gauge according to still another embodiment of the present invention.
Figure 16:
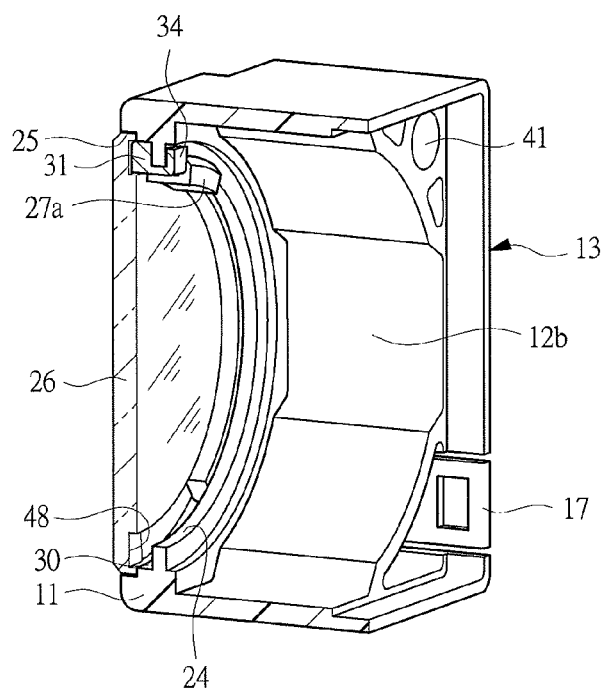
FIG. 16 is a perspective cutaway view showing a case of the pressure gage with the transparent cover and the preset pressure indicating member shown in FIG. 15 being mounted on it.

FIG. 15 is a rear perspective view showing a transparent cover and a preset pressure indicating member in the pressure gauge according to still another embodiment of the present invention. FIG. 16 is a perspective cutaway view showing a case of the pressure gage with the transparent cover and the preset pressure indicating member shown in FIG. 15 being mounted on it. FIG. 17A is a rear view showing the case of the pressure gauge with the transparent cover and the preset pressure indicating member shown in FIG. 15 being mounted on it, FIG. 17B is an enlarged cross-sectional view showing the pressure gauge along a line 17B-17B in FIG. 17A, and FIG. 17C is an enlarged cross-sectional view showing a 17C portion in FIG. 17B.

The thickness in the direction of the rotating axis of the display band portion 32 of the preset pressure indicating member 31 shown in FIGS. 15 to 17C is larger than the thickness in the direction of the rotating axis of the ring-shaped concave portion 30, and with the preset pressure indicating member 31 being slidably attached in the ring-shaped concave portion 30, the front side portion of the display band portion 32 protrudes in the ring-shaped concave portion 25. The rear surface of the transparent cover 26 is formed with a ring-shaped guide groove 48 corresponding to the preset pressure indicating member 31, and the guide groove 48 opens on the rear surface. When the preset pressure indicating member 31 is slidably attached to the ring-shaped concave portion 30, and the transparent cover 26 is rotatably attached to the ring-shaped concave portion 25, the front side portion of the preset pressure indicating member 31 is designed to be slidably mounted in the guide groove 48. When the preset pressure indicating member 31 is slid with respect to the front wall 11 in association with the rotation of the transparent cover 26, the guide groove 48 is not relatively rotated with respect to the preset pressure indicating member 31. On the other hand, when the transparent cover 26 is slid with respect to the preset pressure indicating member 31, the guide groove 48 is rotated along the preset pressure indicating member 31. That is, since the guide groove 48 is slid along the preset pressure indicating member 31 when only the transparent cover 26 is rotated, the transparent cover 26 is slid with respect to the preset pressure indicating member 31. As just described, the transparent cover 26 may be formed with a guide groove 48 in which the preset pressure indicating member 31 is mounted and slidably movable.

In the pressure gauge 10 shown in the drawings, the preset pressure indicating member 31 provided on the inside of the transparent cover 26 is driven by the transparent cover 26, so the position of the first display section 35 of the preset pressure indicating member 31 is set and adjusted by the transparent cover 26. On the other hand, the second display section 37 is formed by the edge of the opaque shield portion 36 provided on the transparent cover 26, and the position of the second display section 37 is set and adjusted by rotating the transparent cover 26. In this way, the preset pressure range which is displayed between the two display sections 35 and 37 in the display band portion 32 of the preset pressure indicating member 31 and exposed to the outside through the transparent cover 26 to be observed can be easily set by the rotation operation of the transparent cover 26. Further, when setting and adjusting the preset pressure range, the operator does not touch the scale plate 22, so the scale plate 22 is not deformed or damaged and the durability of the pressure gauge 10 can be improved.

The preset pressure range is displayed radially on the outer side of the pressure scale provided on the scale plate 22, so the visibility of the preset pressure range is improved, and it is possible to observe whether or not the indicator needle 23 is within the preset pressure range from the outside at first glance.

The present invention is not limited to the embodiments described above, and various modifications are possible without departing from the scope of the invention. For example, although the front wall 11 is integrally provided with the case 13 of the pressure gauge 10, the case may be formed by the side walls 12a to 12d and the support plate and a rectangular front wall 11 may be attached to the front of the case. The shape of the case 13 is not limited to the rectangular shape as shown in the drawings, but may be a circular shape.

The present invention can be applied for measuring pressure of fluid supplied to a fluid pressure equipment.

What is claimed is:

1. A pressure gauge including an indicator needle to be rotated by an angle corresponding to pressure of fluid, and a scale plate marked with a pressure scale which is indicated by the indicator needle along a rotation path of the indicator needle, the pressure gauge comprising:
   a pressure gauge main body including the scale plate and the indicator needle, and being provided with a pressure measuring device configured to rotate the indicator needle corresponding to the pressure of fluid;
   a front wall formed with a circular guide hole, a first ring-shaped concave portion larger in inner diameter than the guide hole, and a second ring-shaped concave portion larger in diameter than the first ring-shaped concave portion, the front wall being attached to the pressure gauge main body, the scale plate being exposed to the outside through the circular guide hole;
   an arc-shaped preset pressure indicating member extending along the pressure scale in a circular arc pattern, and being provided with a first display section at one end thereof, the preset pressure indicating member being slidably attached to the first ring-shaped concave portion along the guide hole;
   a transparent cover rotatably attached to the second ring-shaped concave portion, and configured to cover the preset pressure indicating member and the scale plate;
   an opaque shield portion extending along the pressure scale in a circular arc pattern, and being provided on the transparent cover, and provided with a second display section at one end thereof; and
   a driving pawl portion provided on the transparent cover, and configured to come into contact with a driven pawl portion provided on the preset pressure indicating member to have the preset pressure indicating member perform a following rotation,
   wherein a guide groove opens on one of a front face the front wall and a rear face of the preset pressure indicating member, a guide protrusion protrudes from the other of the front face of the front wall and the rear face of the preset pressure indicating member, and the preset pressure indicating member is mounted and slidably movable in the guide groove,
   when the preset pressure indicating member is rotated in one direction via the transparent cover to set a position of the first display section, and the transparent cover is then rotated in the reverse direction to set a position of the second display section, the preset pressure indicating member has an area which is not covered by the shield portion, the area being displayed to the outside through the transparent cover.

2. The pressure gauge according to claim 1, wherein the preset pressure indicating member is formed with an arc-shaped guide groove, the front wall is provided with a ring-shaped guide protrusion, and the rotation of the preset pressure indicating member is guided by the guide protrusion.

3. The pressure gauge according to claim 1, wherein the front wall is formed with a ring-shaped guide groove, the preset pressure indicating member is provided with an arc-shaped guide protrusion, and the rotation of the preset pressure indicating member is guided by the guide groove.

4. The pressure gauge according to claim 1, wherein the transparent cover is provided with an operational portion for a rotation operation.

5. The pressure gauge according to claim 1, wherein the transparent cover is provided with a plurality of driving pawl portions, the driving pawl portions are engaged with the rear surface of the front wall, and the transparent cover is rotatably attached to the front wall by the driving pawl portions.

6. A pressure gauge including an indicator needle to be rotated by an angle corresponding to pressure of fluid, and a scale plate marked with a pressure scale which is indicated by the indicator needle along a rotation path of the indicator needle, the pressure gauge comprising:
   a pressure gauge main body including the scale plate and the indicator needle, and being provided with a pressure measuring device configured to rotate the indicator needle corresponding to the pressure of fluid;
   a front wall formed with a circular guide hole, a first ring-shaped concave portion larger in inner diameter than the guide hole, and a second ring-shaped concave portion larger in diameter than the first ring-shaped concave portion, the front wall being attached to the pressure gauge main body, the scale plate being exposed to the outside through the circular guide hole;
   an arc-shaped preset pressure indicating member extending along the pressure scale in a circular arc pattern, and being provided with a first display section at one end thereof, the preset pressure indicating member being slidably attached to the first ring-shaped concave portion along the guide hole;
   a transparent cover rotatably attached to the second ring-shaped concave portion, and configured to cover the preset pressure indicating member and the scale plate;
   an opaque shield portion extending along the pressure scale in a circular arc pattern, and being provided on the transparent cover, and provided with a second display section at one end thereof; and
   a driving pawl portion provided on the transparent cover, and configured to come into contact with a driven pawl portion provided on the preset pressure indicating member to have the preset pressure indicating member perform a following rotation,
   wherein an arc-shaped guide groove opens on a rear face of the transparent cover, and the preset pressure indicating member is mounted and slidably movable in the guide groove,
   when the preset pressure indicating member is rotated in one direction via the transparent cover to set a position of the first display section, and the transparent cover is then rotated in the reverse direction to set a position of the second display section, the preset pressure indicating member has an area which is not covered by the shield portion, the area being displayed to the outside through the transparent cover.

* * * * *

UNITED STATES PATENT AND TRADEMARK OFFICE
CERTIFICATE OF CORRECTION

| | |
|---|---|
| PATENT NO. | : 9,134,192 B2 |
| APPLICATION NO. | : 13/695978 |
| DATED | : September 15, 2015 |
| INVENTOR(S) | : Takeshi Yamauchi |

It is certified that error appears in the above-identified patent and that said Letters Patent is hereby corrected as shown below:

ON THE TITLE PAGE:

(73) Assignee: please delete "KOGNAEI" and substitute with --KOGANEI--

Signed and Sealed this
Twenty-sixth Day of January, 2016

Michelle K. Lee
*Director of the United States Patent and Trademark Office*

UNITED STATES PATENT AND TRADEMARK OFFICE
CERTIFICATE OF CORRECTION

Page 1 of 1

PATENT NO.        : 9,134,192 B2
APPLICATION NO.   : 13/695978
DATED             : September 15, 2015
INVENTOR(S)       : Takeshi Yamauchi et al.

It is certified that error appears in the above-identified patent and that said Letters Patent is hereby corrected as shown below:

TITLE PAGE: Item 73

"Assignee: please delete "KOGNAEI" and substitute with --KOGANEI--"

(as corrected to read in the Certificate of Correction issued January 26, 2016) is deleted and patent is returned to its original state with the applicant & assignee name in patent to read --KOGNAEI CORPORATION, Tokyo (JP)--

Signed and Sealed this
Third Day of May, 2016

Michelle K. Lee
*Director of the United States Patent and Trademark Office*